US007792517B2

(12) United States Patent
Mowry et al.

(10) Patent No.: US 7,792,517 B2
(45) Date of Patent: Sep. 7, 2010

(54) DIGITAL CONTENT ACQUISITION AND DISTRIBUTION IN DIGITIAL RIGHTS MANAGEMENT ENABLED COMMUNICATIONS DEVICES AND METHODS

(75) Inventors: Kevin C. Mowry, Irving, TX (US); Ronald F. Buskey, Loves Park, IL (US)

(73) Assignee: Motorola, Inc., Schaumburg, IL (US)

( * ) Notice: Subject to any disclaimer, the term of this patent is extended or adjusted under 35 U.S.C. 154(b) by 2093 days.

(21) Appl. No.: 10/458,391

(22) Filed: Jun. 10, 2003

(65) Prior Publication Data

US 2004/0253942 A1 Dec. 16, 2004

(51) Int. Cl.
*H04M 1/66* (2006.01)
*G06F 21/10* (2006.01)

(52) U.S. Cl. .................... 455/410; 455/550.1; 455/557; 725/25

(58) Field of Classification Search ................. 455/410, 455/411, 550.1, 557; 713/167, 184, 185, 713/200, 201; 725/25; 709/224; 705/51, 705/52, 59
See application file for complete search history.

(56) References Cited

U.S. PATENT DOCUMENTS

| 6,002,772 | A | 12/1999 | Saito | |
| 7,251,832 | B2* | 7/2007 | Venters et al. | 726/26 |
| 2001/0052077 | A1 | 12/2001 | Fung et al. | |
| 2002/0146237 | A1 | 10/2002 | Safadi | |
| 2003/0065802 | A1* | 4/2003 | Vitikainen et al. | 709/231 |
| 2003/0093694 | A1 | 5/2003 | Medvinsky et al. | |
| 2003/0131353 | A1 | 7/2003 | Blom et al. | |
| 2004/0024688 | A1* | 2/2004 | Bi et al. | 705/37 |
| 2004/0064719 | A1* | 4/2004 | de Jong et al. | 713/200 |
| 2004/0133914 | A1* | 7/2004 | Smith et al. | 725/86 |
| 2004/0158741 | A1* | 8/2004 | Schneider | 713/201 |
| 2004/0198308 | A1* | 10/2004 | Hurst et al. | 455/403 |
| 2004/0249768 | A1* | 12/2004 | Kontio et al. | 705/65 |

FOREIGN PATENT DOCUMENTS

| CN | 1321265 A | 11/2001 |
| EP | 1128250 A2 * | 8/2001 |
| EP | 1128250 B1 | 1/2007 |
| WO | 0116671 A1 | 3/2001 |

OTHER PUBLICATIONS

"DRM Content Format Version 1.0 Version 13—Sep. 2002, Open Mobile Alliance OMA-Download-DRMCF-v1_0-20020913-C", Open Mobile Alliance, Ltd., 14 pages.

* cited by examiner

*Primary Examiner*—Melur Ramakrishnaiah

(57) ABSTRACT

A method for distributing content in a communications network including obtaining (210) encrypted content, for example, from a content provider or from another subscriber terminal, obtaining (220) a rights object for the content, and in some embodiments obtaining an encrypted token based on the identity of the subscriber terminal obtaining the rights object, maintaining (230) a relation between the content and identity of the subscriber obtaining the rights object, and tracking (240) distribution of the content by the subscriber terminal that obtained the rights object in the content.

18 Claims, 3 Drawing Sheets

DIGITAL CONTENT ACQUISITION AND DISTRIBUTION IN DIGITIAL RIGHTS MANAGEMENT ENABLED COMMUNICATIONS DEVICES AND METHODS

FIELD OF THE DISCLOSURE

The present disclosure relates generally to the management of digital content, and more particularly to the acquisition and distribution of content and rights therein in subscriber terminals, for example, in Digital Rights Management (DRM) enabled mobile cellular communications handsets, and methods therefor.

BACKGROUND

The distribution of digital content to wireless devices promises new business opportunities for network operators and content providers, although the susceptibility of digital content to unauthorized copying and/or distribution remains an impediment to growth in these and other digital content distribution environments.

The mobile wireless communications industry has recognized that Digital Rights Management (DRM) technology may enable the secure distribution of content to, and the controlled consumption thereof, on wireless communications devices. The Open Mobile Alliance (OMA), which is a wireless communications industry standardization body, has for example developed DRM standards that generally provide the mechanisms required to package content. The OMA standards also provide for the assignment of permissions and constraints ("rights objects") to content, and the delivery of content and associated rights objects to DRM enabled wireless communications terminals. The OMA DRM solution is independent of the transport and content delivery mechanism and is suitable for push and pull/download applications, Multimedia Messaging Services (MMSs), and streaming applications, among others.

One characteristic of the OMA DRM solution and possibly other DRM technologies is the ability for users to directly send protected content to others by a process referred to as "superdistribution." When a second user, the recipient, receives the protected content, the recipient must contact a content provider to obtain permission, for example, a rights object, to use the protected content. The superdistribution of content by subscriber terminals is an effective and inexpensive way for content providers to proliferate content.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
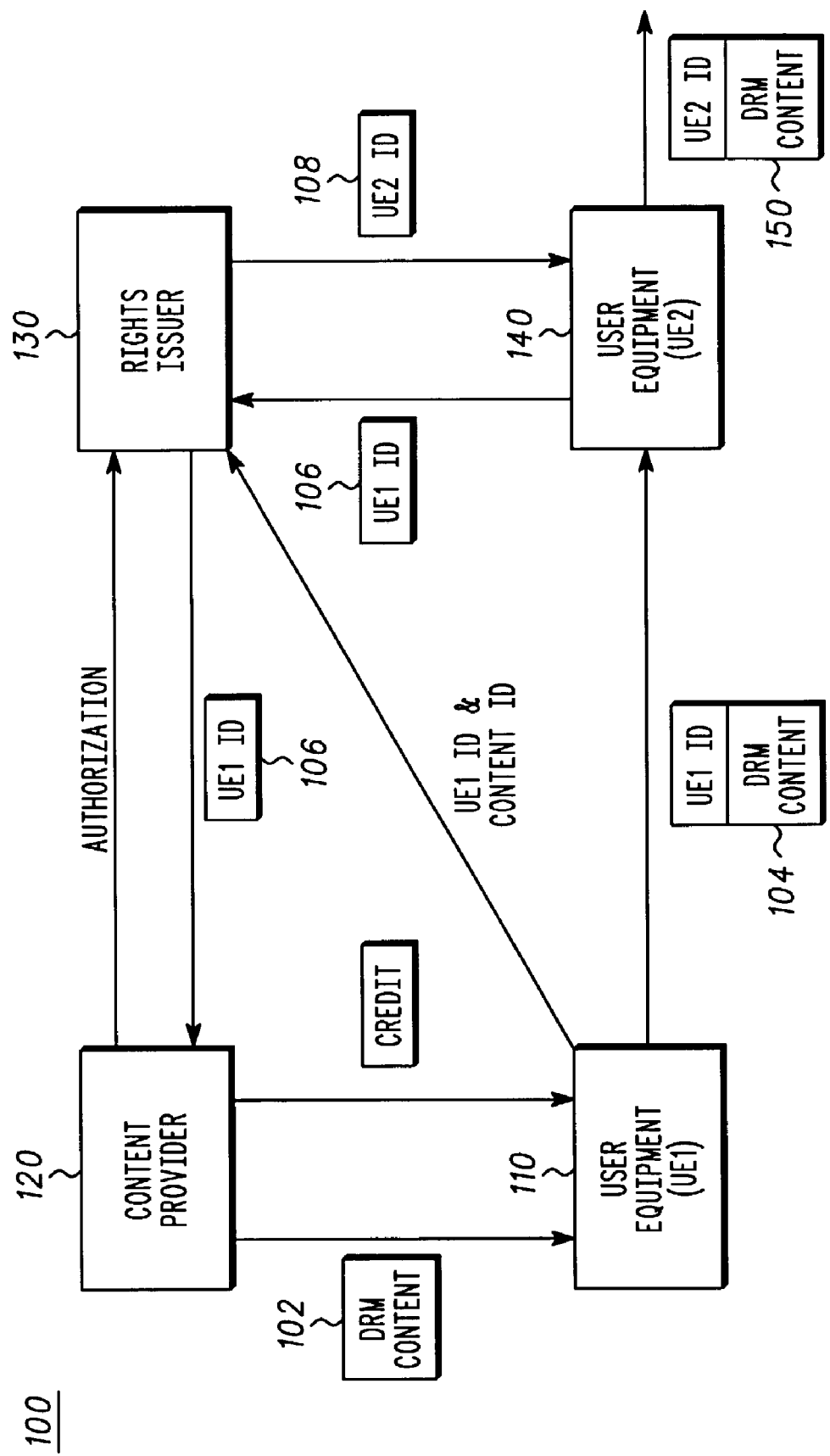
FIG. 1 is an exemplary content distribution diagram in a communications network.

In the exemplary process diagram 100 of FIG. 1, a first subscriber terminal 110 obtains content from a content provider 120. In the exemplary application, the subscriber terminal is a mobile wireless communications device, for example, Global System for Mobile communications (GSM) user equipment (UE) that communicates in a GSM communications network, or Universal Mobile Telephony Standards (UMTS) W-CDMA UE that communicates in a UMTS communications network. The subscriber terminal or device may also communicate pursuant to some other communications standard. In other embodiments, the subscriber terminal may be a fixed terminal, for example, a personal computer or other device connected to the Internet or to some other network. The subscriber terminal may also be a DRM enabled home entertainment system that can perform DRM transactions for on-demand audio, video, gaming, etc. More generally, the subscriber terminal is any communications device with the capacity to receive and transmit or forward content, for example, over a network. There is no requirement that the communications device subscribe to any type of communications service, or that the device have the ability to use content, other than receive and transmit content.

In FIG. 1, the exemplary subscriber terminal, UE1 110, obtains content in a Digital Rights Management (DRM) package 102, for example, a DRM package developed by the Open Mobile Alliance (OMA) wireless communications industry standardization body, or some other Digital Rights Management (DRM) technology. The subscriber terminal may give consideration for the content, for example, by purchasing the content or a rights object for the content from a content server or from a rights issuing server connected to the network. Mechanisms and protocols for exchanging consideration for content in communications networks are well known. In other applications, acquisition of the content may not require consideration. At least some principles of the disclosure are applicable whether or not consideration is exchanged for the content.

Figure 2:
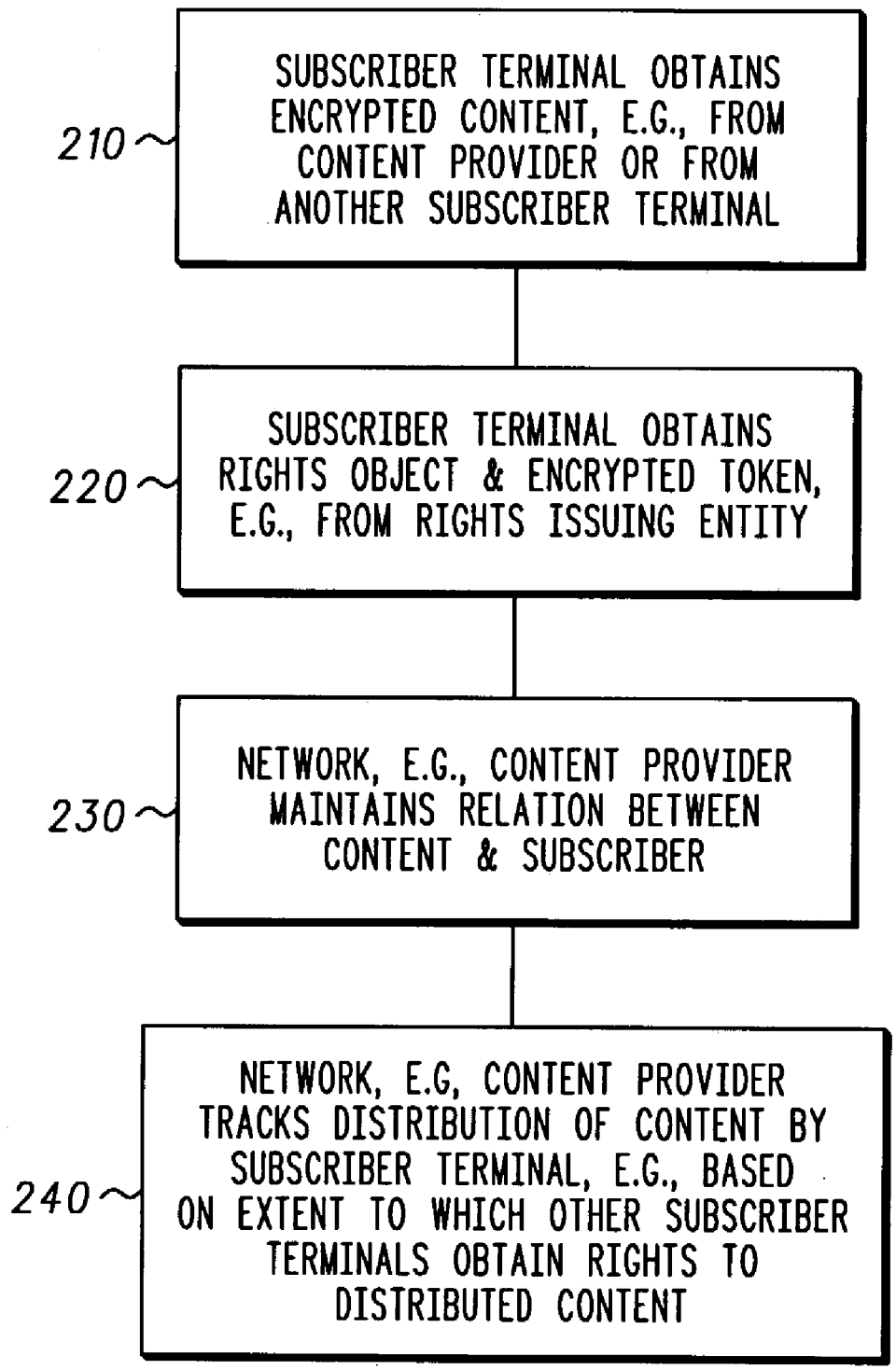
FIG. 2 is an exemplary process flow block diagram.

In the process diagram 200 of FIG. 2, at block 210, a subscriber terminal obtains content, for example, from a content server or from another subscriber terminal. In FIG. 1, the subscriber terminal obtains encrypted content in a digital rights management (DRM) package 102 from a content server 120. For example, the user of subscriber terminal UE1 110 browses to a website and selects content, for example, an audio file or a video game, to download. As part of the exemplary process, when the user selects the content, the subscriber terminal sends its unique subscriber identity to the content provider 120 using a defined protocol. The content provider 120 encrypts the content and creates a unique content identity, if one does not already exist. In one embodiment, the content provider 120 provides the subscriber terminal with the encrypted content in a DRM package having the content identity added to a header in the DRM package. The content provider maintains a record of the subscriber identity that may be used in later transactions for rewarding content superdistribution.

In one embodiment, the unique content identity associated with the content is in the form of a Uniform Resource Identifier (URI), which is located in a header of the DRM package having the encrypted content. The URI maps to a Content Encryption Key (CEK), which may be used to decrypt the encrypted content. Uniform Resource Identifiers, which include the more specific class of URLs, are short strings that identify resources on the Web including, for example, documents, images, downloadable files, services, electronic mailboxes, and other resources, etc. A URI makes resources available under a variety of naming schemes and access methods such as HTTP, FTP and Internet mail addressable in the same way.

The subscriber terminal must generally obtain a license (the rights) to use the content, and in one embodiment the subscriber terminal obtains the rights in the form of a rights object from a rights issuing entity identified by a URI in the DRM package. In other embodiment, these rights are obtained directly from the content provider or from some other source. In some embodiments, the subscriber terminal may have limited access to the content without obtaining the rights thereto. For example, the subscriber terminal may have access to samples or clips of the content for the purpose of generating interest in obtaining a license for full rights to the content.

In FIG. 2, at block 220, the subscriber terminal obtains a rights object for the encrypted content, and in some embodiments the subscriber terminal also obtains an encrypted token from the rights issuing entity, as discussed more fully below. In one embodiment, when a user wishes to obtain a license for content, the user's subscriber terminal sends the content identity along with other relevant information, including its subscriber identity, to a rights issuing entity, which uses the content identity to obtain the appropriate CEK, which may be used by the subscriber terminal to access the encrypted content. For example, DRM software on the subscriber terminal uses the CEK to decrypt the encrypted content.

The subscriber identity is generally a unique identity associated with the subscriber terminal, for example, an Internet Protocol (IP) address, or an International Mobile Subscriber Identity (IMSI) provided by a Subscriber Identity Module (SIM) of the subscriber terminal, a user equipment identity provided by a Universal SIM (U-SIM) of the subscriber terminal, etc.

In FIG. 1, the subscriber terminal UE1 110 sends its subscriber identity and the identity of the content for which a rights object is desired to a rights issuer 130, which has authority from the content provider 120 to grant content licenses, for example, in the form of rights objects. In one embodiment, the rights issuing entity maintains a mapping of the content identity and the content provider, which provides the content identity and rights issuing authorization to the rights issuing authority or entity. The rights issuing entity sends the CEK for the content identified by the content identity along with the associated rights to the subscriber terminal when the subscriber terminal requests rights to the content, for example, upon purchasing a license for the content.

In FIG. 2, at block 220, the subscriber terminal obtains a rights object associated with the encrypted content obtained at block 210. In some embodiments, the subscriber terminal also receives an encrypted token. In one embodiment, the rights issuing entity generates the encrypted token based on the subscriber identity information received from the subscriber terminal obtaining the rights object. In other embodiments, the encrypted token is based on the identity of the content for which the rights object is requested. The rights object and encrypted token may be sent to the subscriber terminal in a common message or separately. In one embodiment, the network provides the token to the subscriber terminal only if the subscriber terminal acquires rights to the content, for example, as a rights object. In another embodiment, the content provider performs the functions of the rights issuing entity.

In one embodiment, the subscriber terminal UE1 110 combines the subscriber identity information with the content, for example, by adding the encrypted token to a header portion of a DRM package containing the content. In other embodiments the token is combined with the content at the network, for example, at a rights issuing server or at a content server. Other encrypted tokens in the DRM header may be replaced or remain with the new token.

In FIG. 2, at block 230, a relation is maintained at the network between the content and the subscriber identity of the subscriber device that has received content or obtained a license or a rights object for the content. In FIG. 1, for example, the rights issuing entity 130 provides the subscriber identity for the subscriber terminal UE1 to the content provider 120, which maintains, for example, in a database, a relation between the subscriber identity and the content identity for which rights were obtained by the subscriber terminal UE1 110.

In FIG. 1, the subscriber terminal UE1 110 transfers content and subscriber identity information, for example, a DRM package 104 combined with an encrypted token based on the identity of subscriber terminal UE1 110, to another subscriber terminal UE2 140. More generally, the subscriber terminal may distribute the content and the subscriber identity information to many other subscriber terminals.

The subscriber terminal UE2 140 must obtain permission, for example, in the form of a rights object, to utilize the content received from subscriber terminal UE1 110. For example, the subscriber terminal UE2 140 sends the content identity for the encrypted content to the rights issuing entity, which provides the subscriber terminal with a rights object including, for example, a CEK, which may be used to decrypt the content, as discussed above.

In FIG. 1, the subscriber terminal also sends the encrypted token 106 based upon the identity of the subscriber terminal UE1 110 (from which the content originated) to the rights issuer 130 as part of the request to obtain rights for the content in the DRM package 104, which was received from subscriber terminal 110. The rights issuing entity notifies the content provider that a rights object was issued for content corresponding to the content identity. In one embodiment, the rights issuing entity sends the encrypted token 106 based on the identity of subscriber terminal UE1 110 to the content provider 120.

In FIG. 2, at block 240, the network, for example, the content provider, tracks the distribution of content by the subscriber terminal UE1 110, for example, based upon information provided by the rights issuer. Since the content provider maintains the relation or mapping between the content identity and subscriber identity, the content provider may maintain a record that the distribution of content by subscriber terminal UE1 resulted in a new content license to the subscriber terminal UE2 140. In one application, the content tracking information may be used to evaluate the performance of subscriber terminal 110 or it may be used as a basis for an award or credit, for example, based upon the extent to which the subscriber terminal distributed to other subscriber terminals that obtained rights objects for the content. Thus in some embodiments, the rights issuer 130 only sends the subscriber identity of the subscriber terminal UE1 110 to the content provider 120 if other subscriber terminals obtain rights to the content received from subscriber terminal 110.

In some embodiments, the subscriber terminal UE2 140 sends its subscriber identity to the rights issuer 130 when requesting the rights object for the encrypted content received from subscriber terminal UE1 110. The rights issuer generates an encrypted token 108 based on the identity of subscriber terminal UE2 140. The encrypted token may or may not include the identity of the subscriber terminal UE1 110 from which the encrypted content originated. In FIG. 2, at block 220, the rights issuer also sends the encrypted token to the subscriber terminal. The encrypted token and the CEK may be provided to the subscriber terminal in the same message.

Figure 3:
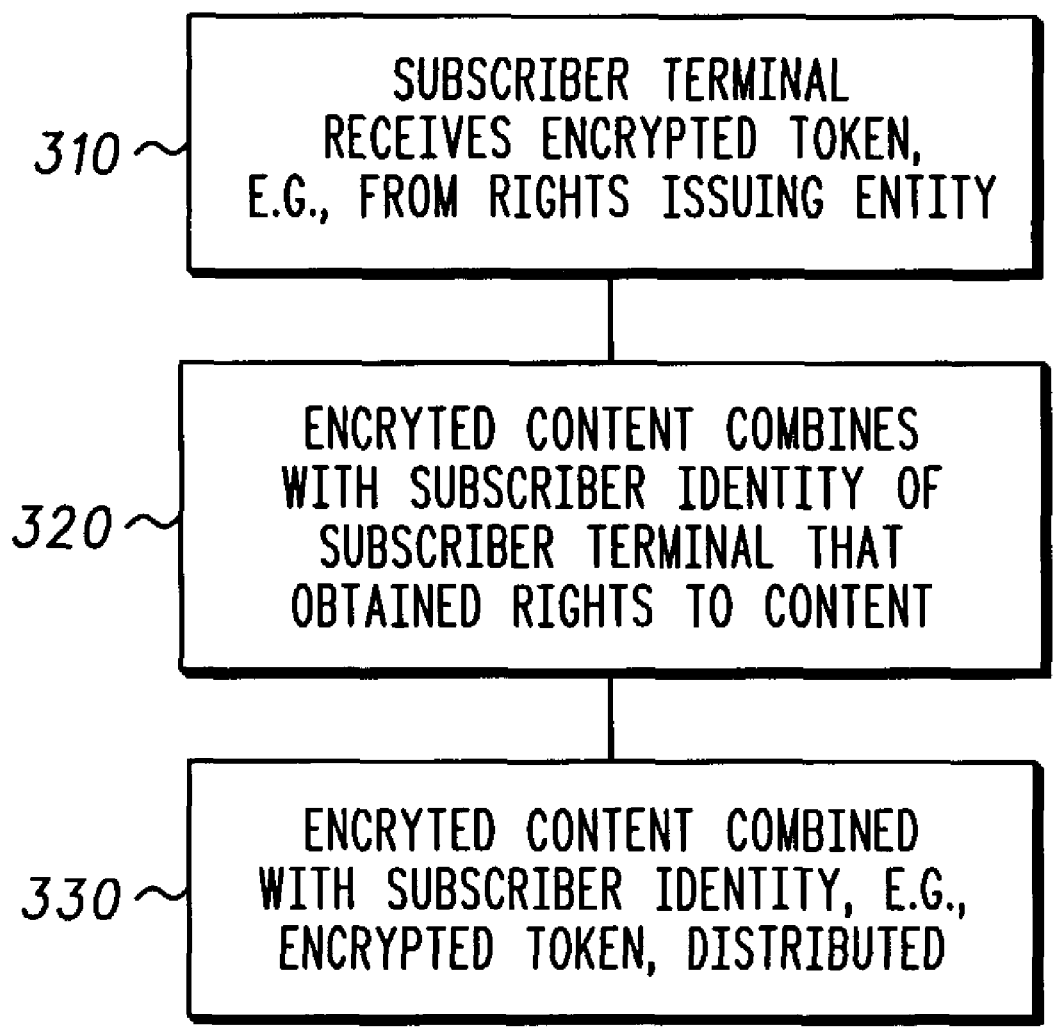
FIG. 3 is another exemplary process flow block diagram.

In the process diagram 300 of FIG. 3, at block 310, upon sending the content identity and the subscriber identity to the network as discussed above, the subscriber terminal UE2 140 receives the encrypted subscriber identity information for subscriber terminal UE2, for example, in the form of the encrypted token 108, upon obtaining the rights object for the content received from subscriber terminal UE1 110. In some embodiments the encrypted token 108 is also based on the identity of the content associated with the digital rights management package for which the rights object was obtained by subscriber terminal UE2 140.

In FIG. 3, at block 320, the subscriber device UE2 140 combines the encrypted subscriber identity information for UE2 with the encrypted content. In the exemplary embodiment, the subscriber terminal UE2 140 adds the encrypted token to a header of the digital rights management package. In FIG. 1, the subscriber terminal UE2 140 distributes the encrypted content, which is in the exemplary form of a DRM package 150, to other subscriber terminals. The DRM package 150 also includes in its header the encrypted token based on the identity of the subscriber terminal UE2 140, which may be used by the content provider to track the distribution of the content by the subscriber terminal UE2 140, as discussed further below.

In some embodiments, when subscriber terminal UE2 140 obtains rights to the encrypted content, the rights issuing entity notifies the content server or other entity that subscriber terminal UE2 obtained rights to the content by providing the subscriber and content identities, as discussed above in connection with the notification of the content provider that subscriber terminal UE1 110 obtained a rights object to the content. The content server or other entity may then maintain a relation between the content and the subscriber terminal UE2 140, for example, a relation between the subscriber and content identities, for tracking the distribution of content by subscriber terminal UE2. In FIG. 3, at block 330, the subscriber terminal distributes the encrypted content with the new encrypted token.

While the present disclosure and what are considered presently to be the best modes of the inventions have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a communications network entity, the method comprising:
    receiving a unique subscriber identity from a subscriber terminal connected to the communications network,
    the unique subscriber identity received in association with content selected by the subscriber terminal;
    maintaining a relation between the content and the subscriber identity at the communications network;
    receiving a notification that a rights object for the content has been issued to a third party subscriber device.

2. The method of claim 1,
    providing a unique content identity for the content selected by the subscriber terminal;
    maintaining the relation between the content and the subscriber identity by maintaining a relation between the content identity and the subscriber identity.

3. The method of claim 2,
    encrypting the content selected by the subscriber terminal, combining the encrypted content and content identity in a digital rights management package,
    transmitting the digital rights management package to the subscriber terminal from which the unique subscriber identity was received.

4. The method of claim 2, the subscriber terminal is a mobile wireless communications device, combining the encrypted content and content identity in a digital rights management package specified by the Open Mobile Alliance.

5. The method of claim 1, providing the content identity to a rights issuing entity in the communications network.

6. The method of claim 1, crediting the subscriber terminal for the rights object that was issued for the content.

7. The method of claim 1, tracking the issuance of the rights object for the content to the third party subscriber device.

8. A method in a communications network entity, the method comprising:
    obtaining a subscriber identity and content information from a subscriber terminal connected to the communications network;
    generating a content tracking encrypted token based on the subscriber identity received;
    providing a rights object for content associated with the content information and providing the encrypted token to the subscriber terminal from which the subscriber identity was received.

9. The method of claim 8, maintaining a relation between the subscriber identity received with the content identity at the communications network.

10. The method of claim 8, the content information obtained from the subscriber terminal includes a unique content identity, generating the encrypted token based on the content identity.

11. The method of claim 8, generating the encrypted token based on the content information received.

12. A method in a subscriber terminal connectable to a communications network, the method comprising:
    receiving a content tracking encrypted token associated with a digital rights management package for which a rights object has been obtained by the subscriber terminal;
    adding the encrypted token to the digital rights management package at the subscriber terminal.

13. The method of claim 12, forwarding the digital rights management package with the encrypted token to another subscriber terminal.

14. The method of claim 12, obtaining the rights object to the digital rights management package in response to sending a subscriber identity for the subscriber terminal and sending a content identity to the network.

15. The method of claim 12,
    the encrypted token associated with the digital rights management package is based on a subscriber identity of the subscriber terminal;
    adding the encrypted token based on the content identity to the digital rights management package.

16. A method in a subscriber terminal, the method comprising:
    receiving a digital rights management package including content,
    the digital rights management package includes a content identity for the content and a content tracking encrypted token associated with an origin of the digital rights management package;
    adding subscriber identity information of the subscriber terminal to the digital rights management package only if a rights object associated with the content in the digital rights management package is obtained by the subscriber terminal.

17. The method of claim 16,
obtaining the rights object for the digital rights management package and a new content tracking encrypted token based on a subscriber identity of the subscriber terminal from a content rights issuing entity,
adding subscriber identity information of the subscriber terminal to the digital rights management package includes adding the new content tracking encrypted token to the digital rights management package.

18. The method of claim 17, obtaining the rights object from the content rights issuing entity in response to sending the subscriber identity of the subscriber terminal and an identity for the content in the digital rights management package to the rights issuing entity.

\* \* \* \* \*